US010388470B2

(12) United States Patent
Humphreys et al.

(10) Patent No.: US 10,388,470 B2
(45) Date of Patent: Aug. 20, 2019

(54) ILLUMINATED SWITCH OR INDICATOR WITH INTEGRAL DATA COMMUNICATIONS DEVICE AND FAIL SENSE FUNCTION

(71) Applicant: Applied Avionics, Inc., Fort Worth, TX (US)

(72) Inventors: Morris Ray Humphreys, Saginaw, TX (US); Steven A. Edwards, North Richland Hills, TX (US); Craig Jay Coley, Burleson, TX (US)

(73) Assignee: Applied Avionics, Inc., Fort Worth, TX (US)

(*) Notice: Subject to any disclaimer, the term of this patent is extended or adjusted under 35 U.S.C. 154(b) by 135 days.

(21) Appl. No.: 15/675,513

(22) Filed: Aug. 11, 2017

(65) Prior Publication Data

US 2019/0019638 A1 Jan. 17, 2019

Related U.S. Application Data

(60) Provisional application No. 62/544,595, filed on Aug. 11, 2017, provisional application No. 62/375,880, filed on Aug. 16, 2016.

(51) Int. Cl.
*H01H 13/02* (2006.01)
*G06F 1/28* (2006.01)
*G06F 11/273* (2006.01)
*G06F 13/42* (2006.01)
*H01H 9/16* (2006.01)

(52) U.S. Cl.
CPC ............ *H01H 13/023* (2013.01); *G06F 1/28* (2013.01); *G06F 11/2736* (2013.01); *G06F 13/4282* (2013.01); *H01H 9/161* (2013.01)

(58) Field of Classification Search
CPC ........ H01H 13/023; H01H 9/161; G06F 1/28; G06F 11/2736; G06F 13/4282
See application file for complete search history.

(56) References Cited

U.S. PATENT DOCUMENTS 6,210,010 B1 * 4/2001 Pontetti ............... H01H 13/023
200/293
8,476,543 B2 * 7/2013 Hart ..................... H01H 13/023
200/290

OTHER PUBLICATIONS

U.S. Department of Transportation Federal Aviation Administration: DOT/FAA/CT-91/19 Avionics Data Bus Integration Technology (Year: 1992).*
MIL-PRF-22885_108G Switches, Pushbutton, Illuminated, 4-Lamp Replaceable Incandescent or Non-Replaceable Light Emmiting Diode (LED), AbbottAerospace.com (Year: 2014).*

* cited by examiner

*Primary Examiner* — Steven Lim
*Assistant Examiner* — Mancil Littlejohn, Jr.

(57) ABSTRACT

An aircraft annunciator (illuminated switch or indicator) includes, within a housing sized to fit in the panel cutout for a single pushbutton aviation switch, a bus converter to interface with a multiplexed ARINC serial data bus, in order to monitor a remote item of equipment such as an ADS-B transponder. The annunciator is coupled by selected pins to receive data words from the multiplexed ARINC serial data bus. A watchdog timer is continuously reset by valid messages from the transponder, logically ORed with the power supply as well as external analog fault signals in order to generate an output controlling illumination of an FAA-mandated "ADS-B FAIL" legend on the annunciator.

26 Claims, 8 Drawing Sheets

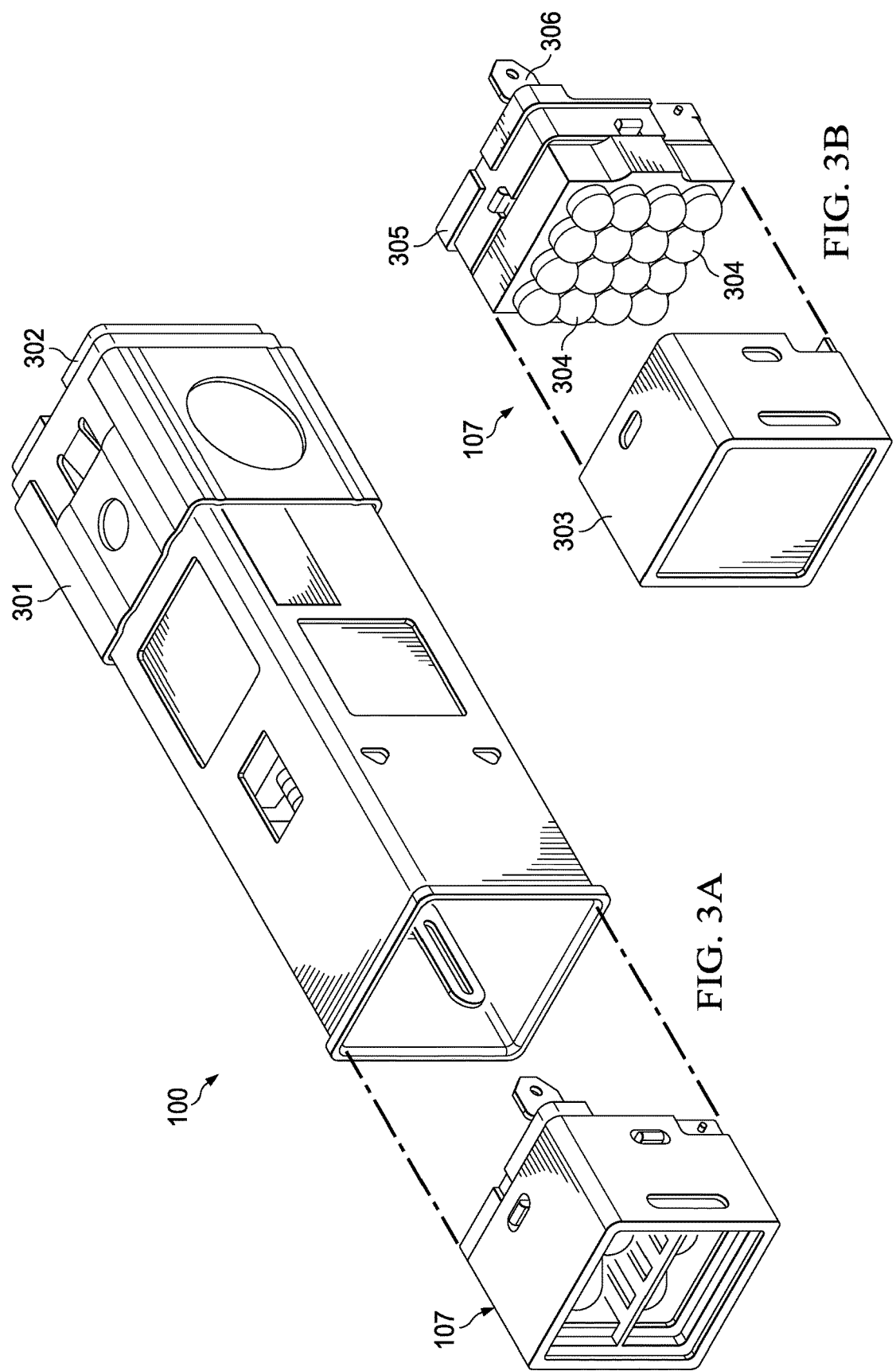

ILLUMINATED SWITCH OR INDICATOR WITH INTEGRAL DATA COMMUNICATIONS DEVICE AND FAIL SENSE FUNCTION

PRIORITY CLAIM AND CROSS-REFERENCE TO RELATED APPLICATIONS

This application claims priority to U.S. Provisional Application No. 62/375,880 filed Aug. 16, 2016 and titled "ILLUMINATED SWITCH OR INDICATOR WITH INTEGRAL DATA COMMUNICATIONS DEVICE" and U.S. Provisional Application No. 62/544,595 filed Aug. 11, 2017 and titled "ILLUMINATED SWITCH OR INDICATOR WITH INTEGRAL DATA COMMUNICATIONS DEVICE AND FAIL SENSE FUNCTION." The content of the above-identified patent document is hereby incorporated by reference.

TECHNICAL FIELD

The present disclosure is directed, in general, to communications between illuminated pushbutton switches or indicators with the equipment being monitored or controlled in aircraft.

BACKGROUND

Traditionally, separate wiring harnesses directly connect each illuminated switch or indicator having individual display legend with an aircraft to the equipment being controlled or monitored. As a result, as many as 22 individual wires could be required to connect a single illuminated switch or indicator within a military or commercial aircraft or comparable military system in ships, tanks, or the like. The weight and complexity of wiring harnesses in a single aircraft or military system thus quickly becomes unwieldy and presents an obstacle to improvement, upgrade or the addition of new equipment or subsystems.

There is, therefore, a need in the art for improved connections to illuminated switches and indicators in at least aircraft and other military vehicles.

SUMMARY

An aircraft annunciator (illuminated switch or indicator) includes, within a housing sized to fit in the panel cutout for a single pushbutton aviation switch, a bus converter to interface with a multiplexed serial data bus, in order to monitor a remote item of equipment such as an ADS-B transponder. The annunciator is coupled by selected pins to communicate data words with the multiplexed serial data bus in order to generate an output controlling either illumination of a legend on the annunciator or an interface with other systems. A watchdog timer is continuously reset by valid messages from the transponder, logically ORed with the power supply as well as external analog fault signals in order to generate an output either controlling illumination of a legend on the annunciator or notifying another system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, or in firmware or software executing on hardware, but excluding software without any hardware. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A, 3B, 3C and 3D are exploded perspective views of an annunciator, or of components thereof, illustrated in FIG. 1;

DETAILED DESCRIPTION

Figure 1:
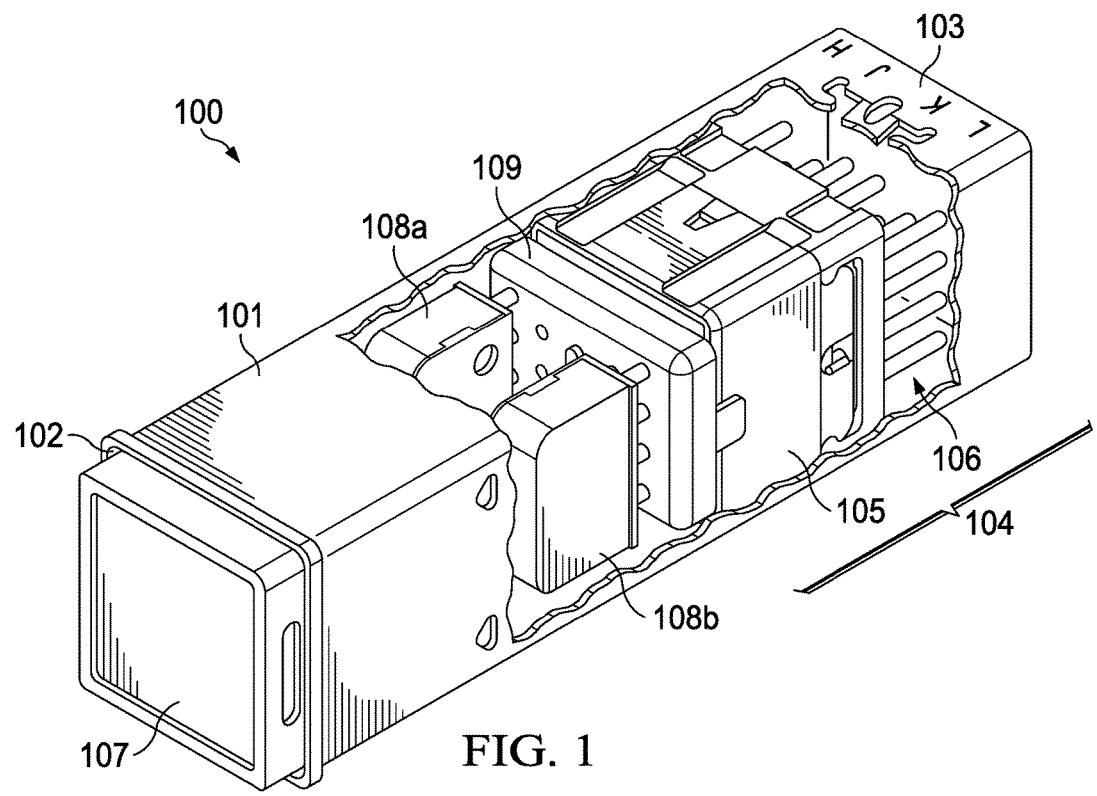
FIG. 1 is a perspective view of an aircraft annunciator that is configured to be coupled to a multiplexed serial data bus according to various embodiments of the present disclosure.

FIGS. 1 through 7C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Modern aircraft and military systems increasingly utilize computers and/or processor-controlled systems to manage equipment. In addition to reducing implementation costs by allowing commercial, off-the-shelf (COTS) products to be repurposed, computers can also reduce the weight and complexity of wiring that was noted above. By using multiplexed serial data busses to transfer data and/or control signals between the pilot/operator and the system's equipment or components, fewer wiring harnesses with less total weight are required. In addition, applications that employ multiplexed serial data busses can combine the provision of information displays onto large touch screens or multi-function displays, used in place of individual annunciators. Exemplary multiplexed serial data busses generally conform to an Aeronautical Radio, Inc. ("ARINC") or military standard ("MIL-STD") technical specification or standard, which may include: ARINC-429; ARINC-629 (Boeing 777); ARINC-664 (Ethernet); ARINC-825 (Controller Area Network or "CAN" bus); and MIL-STD-1553.

The ability to extract information for presentation to the operator or return information from the operator or other systems is critical in many types of aircraft (commercial or military) or other military systems and applications. Data to be presented is traditionally placed on a data bus by complex systems such as mission computers, radio transponders, flight computers, navigation systems, or accessory function systems. Due to the cost and complexity of these complex systems, as well as their regulatory critical nature, modifying those systems to add an additional information display capability can be unfeasible or, at least, undesirable. Moreover, the ability to extract existing data from a bus and display it directly can meet the need to display the desired information without extensive platform modifications. The extracted data that is now accessible may also be output from the unit to illuminate additional auxiliary displays or activate other functions.

One example of a functional application supported using the architecture described herein is meeting an immediate industry need to support a Federal Aviation Administration (FAA) mandate requiring the implementation of Automatic Dependent Surveillance-Broadcast (ADS-B) OUT systems on many existing aircraft. With many of these systems, the data necessary to produce a required "ADS-B FAIL" indication must be extracted from an existing aircraft data bus and then converted into a signal capable of activating illumination of an indicator legend. Typically this requires two separate devices: one device to extract the digital data bus information and convert that digital data into discrete analog signals that drive indicators; and the indicator itself. The implementation embodiments described in the present disclosure are a unique approach that provides the capability of data extraction from a multiplexed serial data bus to trigger a predetermined indication within a single unit.

FIG. 1 is a perspective view of an aircraft annunciator that is configured to be coupled to a multiplexed serial data bus according to various embodiments of the present disclosure. For simplicity, the term "annunciator" will be used herein to refer to both illuminated switches and illuminated indicators. In general, except as described below, aircraft annunciators of the type disclosed are commonly used in commercial and military avionics or military control systems. Moreover, while described as an "aircraft" annunciator, identical or very similar components may be used, for example, in naval vessels, armored vehicles, mobile missile batteries, or the like.

Annunciator 100 includes a housing 101 that is sized to fit within an aircraft instrumentation panel within the space allocated to a pushbutton illuminated switch. That is, the annunciator housing 101 must have a cross-section allowing the portion behind a collar flange 102 on the front end to be received by a panel cutout having typical dimensions that are usually about 0.75 inches (19.1 millimeter or "mm") square. In some embodiments, the panel cutout may be rectangular and slightly larger, such as 0.87 inch (22 mm) height and 1.11 inch (28.2 mm) width. The annunciator housing 101 generally has a length that is typically 2-4 inches from an outer surface for the panel in which the cutout is formed. For example, the length of existing annunciator housings, from the rear-facing surface of collar flange 102 on the front end to the rear end 103, may be between about 1.82 inches (47 mm) and 1.90 inches (49 mm) for a compact annunciator and between about 2.59 inches (66 mm) and 2.67 inches (68 mm) for a high capacity annunciator. To optimize packaging, the length is intended to be as compact as possible but may still vary significantly depending on the complexity of the installed capability.

A portion of the annunciator housing 101 is cut away in FIG. 1 to reveal a bus interface module 104 that is disposed therein. As evident, "module" in the context of the bus interface module 104 in FIG. 1 is not intended to invoke means-plus-function interpretation but instead refers to a physical module that, in the example shown, includes at least a module housing 105, circuitry within and enclosed by the module housing 105, and a plurality of electrical signal connections that are implemented in the example shown by an irregular array 106 of pins. However, "bus interface module" is not being expressly defined as including the specific structure depicted, since the structure may be varied without causing the resulting component to no longer operate as a bus interface module. The circuitry within the bus interface module 104 contains at least circuits implementing a bus converter for a multiplexed serial bus. Solely by way of example, the bus converter portion of the circuitry within the bus interface module 104 may be a single bit converter for an ARINC 429 multiplexed serial bus, together with additional inputs and outputs.

The annunciator housing 101 also receives a switch cap 107 with an illuminated lens cap bearing a legend, such as "ADS-B FAIL." The switch cap 107 contains one or more light emitting diodes (LEDs), such as surface mount diodes (SMDs), controlled to selectively illuminate the legend on the lens cap through a filter between the lens cap and the LEDs. The construction of a suitable switch cap is described in any of U.S. Pat. Nos. 6,323,598, 6,653,798, and 7,453,218, which are incorporated herein by reference. Driving circuits, overvoltage protection devices and fail-safe circuits, filters, face plate and legend construction, and other aspects of the structure and operation for the annunciator 100 are described in the above-identified patents as well as U.S. Pat. Nos. 6,489,728, 6,650,064, 6,670,776, 6,737,814, 7,906,915, 8,222,771, 8,350,493, 8,587,158, and 8,624,442, which are also incorporated by reference.

For at least a high capacity annunciator, the annunciator housing 101 further contains, between the switch cap 107 and the bus interface module 104, either two, four-pin snap-action electromechanical micro-switches 108a-108b, two, four-pin logic components, or other combinations of each. A spacer 109 separates the bus interface module 104 from the micro-switches 108a-108b or logic components, with through-holes to allow pins on the micro-switches 108a-108b to be received by the bus interface module 104. The bus interface module 104 may therefore include conductive paths carrying signals from or for the pins on the micro-switches 108a-108b or logic components to selected ones of the irregular array 106 of pins.

The bus converter within the bus interface module 104 provides the ability to convert data from an ARINC 429 data bus to a discrete signal within the annunciator 100. The bus converter can be implemented for any label, with options including specific ARINC transmission speeds, parity checking, and discrete output type (Active Low or Active Open). As described below, an internal watchdog timer monitors the validity of incoming ARINC data stream. The bus converter can also accommodate two additional external signal inputs with discrete output on "fail."

The annunciator 100 with the bus converter within the bus interface module 104 can offer a solution for a wide range of applications. However, the product is especially well suited, for example, to satisfy the FAA mandate requiring pilot ADS-B Out system status notifications (i.e., illumination of the "ADS-B FAIL" legend when a failure or fault condition is detected), and is an economical solution to meet that industry requirement because the annunciator 100 reduces circuit complexity, size, weight, and installation labor. In some variants, the switch capability may be used in conjunction with the ADS-B Out system status notifications, such as actuation of a switch causing initiation of a reset in local or remote multiplexed serial data bus terminals.

Figure 1A:
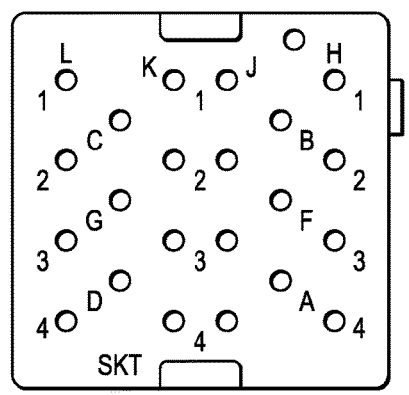
FIG. 1A depicts a typical, industry-standard pin layout for the irregular array of pins in the annunciator.

Those skilled in the art will recognize that at least three obstacles exist to incorporating the bus converter within the bus interface module 104 of the annunciator 100. First, only a limited number of pins can be provided within the constrained cross-sectional area of the annunciator housing 101. The pins for the annunciator 100 establish electrical connection with (for example) the multiplexed serial data bus or other conductors in a wiring harness by being received in aligned conductive openings within a female plug that is inserted into the open rear end 103 of the annunciator housing 101. FIG. 1A depicts a typical, industry-standard pin layout for the irregular array 106 of pins in the annunciator 100. As shown, four vertical columns of four pins each are identified by the letters "L," "K," "J," and "H," which correspond to the marking shown on the annunciator housing 101 near the rear end 103 in FIG. 1. Each pin within one of the vertical columns is sequentially numbered from top to bottom so that, for example, column "J" comprises pins J1, J2, J3 and J4 from top to bottom. Column pairs "L" and "K" and column pairs "J" and "H" are each separated by a respective offset vertical column of three pins, for a total of 22 pins within the irregular array 106 of pins.

The 22 pins illustrated in FIG. 1A represent a realistic number of separate electrical connections that can reasonably be made between the annunciator 100 and other aircraft systems using the wiring harness, given the cross-sectional area of the annunciator housing 101 and the required inter-pin spacing necessary for reliable electrical signaling using the pins. The bus converter circuit described below uses eight pins of the possible 22, requiring some concessions regarding other functionality that can be implemented in the same annunciator 100, such as the number of regions on the lens cap (the entirety, halves, or quadrants) that may be individually illuminated, together with the number of switches 108a-108b and/or logic components that may be functionally included in the annunciator 100.

Second, incorporating the bus converter within the bus interface module 104 of the annunciator 100 uses a portion of the limited space inside the annunciator housing 101. Aircraft interior space is very constrained and at a premium, both in the number of available locations in which to install an avionics component and the amount of physical surface area available for providing all of the requisite displays and switches used for pilot interfacing. While illuminated displays are already used within the aircraft operator's functional space, modification of an existing, approved device might risk jeopardizing a certification for the existing device, or at least might concern aircraft designers and manufacturers that have historically used the existing design. As a result, the inclusion of a new indicator, such as the "ADS-B FAIL" annunciator connected to a serial data bus interface as described above, has historically been performed with an additional external electronic unit rather than modification of an existing unit. Moreover, minimization of the overall added mass is also required whenever adding any additional or new capabilities, since extra added mass to an aircraft adds operational costs by either or both of reduced fuel efficiency and reduced operational load capacity available to the platform.

At the same time, however, illuminated annunciators (push button switches and indicators) are already required within the aircraft, often with existing constrained defined location(s) such as in the primary line of sight for the pilot or crew. Providing a new indicator functionality such as "ADS-B FAIL" within an existing annunciator as proposed herein would eliminate the use of additional packaging space while also reducing the weight of the resulting minimized wiring for both the external unit and the harness wiring. As noted earlier, however, these illuminated switches and indicators have a very restricted physical envelope (usually 0.75 inches square) that uses the minimum panel surface area possible while still safely providing needed functional information or control(s). Providing a new indicator functionality such as "ADS-B FAIL" within an existing annunciator as proposed herein involves functionality tradeoffs and innovative use of space. For example, the additional functionality incorporated into the existing annunciator must combine functions with the pre-existing functionality, which involves reconciling electrical compatibility issues and possible reduction or constraint of the existing functionality. This obstacle is overcome in the design disclosed by the physical construction of the bus interface module 104, described in further detail below.

Third, the bus interface module 104 must meet rigorous standards for reliable operation despite shock, vibration, and the like. This obstacle, like the second, is also addressed by the physical construction of the bus interface module 104 described in further detail below.

Figure 2:
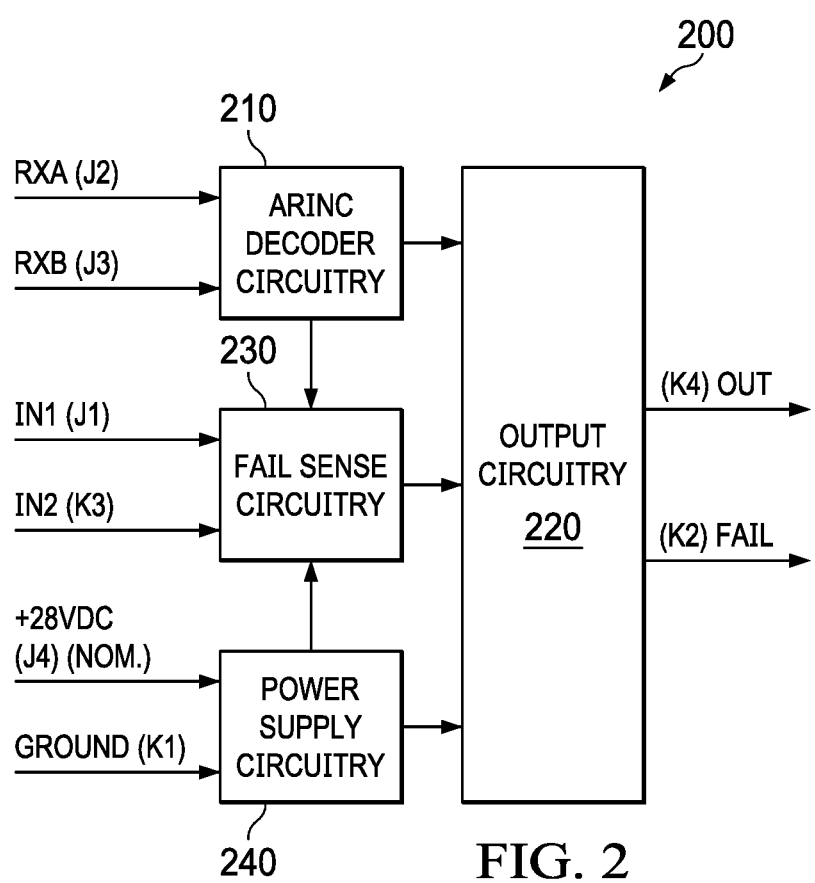
FIG. 2 is a block diagram of a bus converter circuit for coupling an aircraft annunciator to a multiplexed serial data bus according to various embodiments of the present disclosure.

Before describing the physical construction of the bus interface module, it would be beneficial to explain the additional functionality to be incorporated within the annunciator in order to provide operation with a multiplexed serial data bus. FIG. 2 is a block diagram of a bus converter circuit for coupling an aircraft annunciator to a multiplexed serial data bus according to various embodiments of the present disclosure. As with the term "module," the term "circuit" (or "circuitry") in the context of the bus converter circuit 200 in FIG. 2 (or any other circuit block depicted or described herein) is not intended to invoke means-plus-function interpretation. Instead, regardless of the modifier application, each "circuit" refers to a physical, electrical circuit configured to perform the electrical signal processing that is described, regardless of the specific circuit implementation. Moreover, use of any modifier with "circuit" is not intended as an express definition for the respective circuit, since the configuration may be varied without causing the resulting circuit to no longer operate as described.

The bus converter circuit 200 allows the annunciator to function as a terminal on a multiplexed serial data bus, at least as a receiver. The exemplary bus converter circuit 200 shown in FIG. 2 and described below is non-limiting. As previously described, bus converter circuit 200 forms part of the circuitry contained within the module housing 105 of the bus interface module 104. The bus converter circuit 200 in the example shown includes an ARINC 429 decoder circuit 210. As known in the art, ARINC 429 is the technical standard for one predominant avionics data bus used on most higher-end commercial and transport aircraft. The ARINC 429 specification defines the physical and electrical interfaces of a two-conductor data bus and a data protocol to support an aircraft's avionics local area network. ARINC 429 data transfer uses a self-clocking, self-synchronizing data bus protocol in which transmit (Tx) and receive (Rx) signals are on separate ports and are carried on physical conductor pairs (e.g., twisted-pair connection wires) using balanced differential signaling. A single conductor pair is limited to one transmitter and no more than 20 receivers. Data words are 32 bits in length with most messages consisting of a single data word and with the data words transmitted at either 12.5 or 100 kilo-bits per second (kbit/s) to other system elements that are monitoring the bus messages. The transmitter constantly transmits either 32-bit data words or a NULL state. At the receiver end, the ARINC 429 data transfer protocol allows for self-clocking, thus eliminating the need to transmit clocking data.

In the example depicted in FIG. 2, the bus converter circuit 200 includes ARINC decoder circuitry 210 coupled to receive input signals "RxA" and "RxB" on, respectively, connectors or "pins" J2 and J3 (described further below) within the irregular array 106 of pins. While the ARINC decoder circuitry 210 in the example of FIG. 2 is representative of ARINC 429 systems, the example depicted and described may be readily modified for systems conforming to other ARINC specifications, including without limitation ARINC 629, ARINC 664, and ARINC 825. In certain embodiments, the ARINC decoder circuitry 210 is coupled as any one of a plurality of transmitter/receiver systems or receiver-only systems on a multiplexed serial data bus as depicted and described in further detail below.

The ARINC decoder circuitry 210 is also coupled to transmit an output to output circuitry 220 and, preferably, further coupled to transmit an output to fail sense circuitry 230. Fail sense circuitry 230 in the exemplary embodiment is coupled to receive first and second input signals IN1 and IN2 (on pins J1 and K3, respectively) as well as a signal from each of the ARINC decoder circuitry 210 and power supply circuitry 240. The fail sense circuitry 230 is coupled to transmit an output to the output circuitry 220. The power supply circuitry 240 is coupled to receive a positive 28 volt direct current (VDC) power supply signal on pin J4 and is coupled to a ground (GND) on pin K1. The power supply circuitry 240 is further coupled to transmit one output to the fail sense circuitry 230 and another output to the output circuitry 220. The output circuitry 220 is coupled to receive a signal from each of the ARINC decoder circuitry 210, the fail sense circuitry 230, and the power supply circuitry 240. The output circuitry 220 coupled to transmit an output signal OUT on pin K4 for signaling purposes (e.g., for transmission on the multiplexed serial data bus) and an output signal FAIL on pin K2 to indicate a fault condition within one or more of the circuitry contained within the module housing 105 of the bus interface module 104 and/or an external device in communication with that circuitry.

Those skilled in the art will recognize that the complete structure and operation of the circuitry contained within the module housing 105 of the bus interface module 104, which is of the type normally used or suitable for use in avionics or military control systems, is not depicted or described herein. In addition, details of the circuitry for the ARINC decoder circuitry 210, the output circuitry 220, the fail sense circuitry 230, and the power supply circuitry 240 are likewise not depicted or described. Instead, for simplicity and clarity, only so much of the structure and operation of those circuits as is necessary for an understanding of the present disclosure is depicted and described.

In operation of the circuitry contained within the module housing 105 of the bus interface module 104, the ARINC decoder circuitry 210 receives signals from receiver line RXA (pin J2) and receiver line B RXB (pin J3). For example, the ARINC decoder circuitry 210 may receive the 2 conductor ARINC signal input as inputs on pins J2 and J3. Various options may be configured for the ARINC decoder circuitry 210, including: any single ARINC label (000-377); any single data bit (11-31) from selected label; ARINC transmission speed (High or Low); ARINC bit output type (on pin K4), which may be specified to be Active Low or Active Open (high impedance) when the selected data bit=1; handling of source/destination identifier (SDI) bits (9 & 10); or ARINC parity checking (on or off).

In one embodiment, the ARINC decoder circuitry 210 transmits output signals to the fail sense circuitry 230. In another embodiment, the ARINC decoder circuitry 210 transmits output signals to the output circuitry 220. In a preferred embodiment, the ARINC decoder circuitry 210 transmits output signals to both the fail sense circuitry 230 and the output circuitry 220.

General data processing circuitry for comparisons and the like may be implemented as part of the ARINC decoder circuitry 210, the output circuitry 220, or both. On data bus architectures, data either received or transmitted is often complex, with the result that needed information of an input or output can be based on or require more than 1 relevant data bit. When analysis of multiple data bits is necessary, any of the ARINC decoder circuitry 210, the output circuitry 220, or the combination of both will also contains the necessary processing to obtain the desired value. This data processing result will then affect one or more input or output circuit interfaces as defined by the specific application. Otherwise, the output circuitry 220 is internal circuitry that (at least) presents an output. In certain embodiments, the resulting signal from the output circuitry 220 is output to control illumination of the annunciator 100. That is, the output OUT from the output circuitry 220 causes illumination of a legend visible to the pilot, operator or system. In other embodiments, the output OUT from the output circuitry 220 interfaces directly with aircraft or military control systems or equipment.

In one embodiment, the output circuitry 220 receives input signals from the ARINC decoder circuitry 210. In another embodiment, the output circuitry 220 receives input signals from the fail sense circuitry 230. In another embodiment, the output circuitry 220 receives input signals from the power supply circuitry 240. In a preferred embodiment, the output circuitry 220 receives input signals from each of the ARINC decoder circuitry 210, the fail sense circuitry 230, and the power supply circuitry 240. In this preferred embodiment, the output circuitry 220 transmits output signals to other circuits within the annunciator 100 based on the received input signals from the ARINC decoder circuitry 210, the fail sense circuitry 230, and the power supply circuitry 240.

Pins K2 and K4 from the output circuitry 220 are open drain outputs. Pin K4 (OUT) is the decoded ARINC 429 output bit related directly to the ARINC decoder circuitry 210. Pin K2 (FAIL) is based on the output of the fail sense circuitry 230, and is related to status of the internal health monitor and the status of pin J1 (IN 1) and pin K3 (IN 2).

The fail sense circuitry 230 is internal circuitry that, preferably simultaneously, monitors faults in one or more of the +28 VDC power (based on the signal(s) received from the power supply circuitry 240), and/or the serial communications on pins J1 and K3, and/or the external analog inputs RxA and RxB on pins J2 and J3 (based on the signal(s) received from the ARINC decoder circuitry 210). In some preferred embodiments, the fail sense circuitry 230 acts as a health monitor for the ARINC decoder circuitry 210 and the power supply circuitry 240. In such embodiments, the fail sense circuitry 230 includes a watchdog timer continuously reset by valid serial messages logically ORed with the power supply (e.g., from the power supply circuitry 240) as well as external analog fault signals, in order to drive a single "FAIL" output (pin K2). Under normal circumstances, i.e., when the ARINC decoder circuitry 210 and the power supply circuitry 240 are each operating within predetermined normal ranges, the FAIL output from the fail sense circuitry 230 will be a ground signal. The FAIL output will become "open" upon either receiving a "fail" signal from an inputting source or a failure to be continuously reset. When the fail sense circuitry 230 receives a "fail" input signal or fails to be continuously reset, the output becomes "open" (high impedance) and the fail sense circuitry 230 sends a "fail" output signal to the output circuitry 220 to be transmitted on pin K2. In this embodiment, the fail sense circuitry 230 provides the advantage of assurance to the pilot, operator or system that the annunciator 100 is functional and receiving data, providing the additional advantage of immediately notifying the pilot, operator or system when the indicator and/or a monitored system is not functional and/or not receiving data.

In another embodiment, the fail sense circuitry 230 contains a settable voltage comparator to monitor output from the power supply circuitry 240. The power supply circuitry 240 may be implemented using or including a linear regulator such as, for example, a SOT-23 packaged regulator, and functions to maintain a steady threshold voltage of power to the equipment being monitored or controlled. The functional status of the power supply circuitry 240 may be monitored by the fail sense circuitry 230. The settable voltage comparator within the fail sense circuitry 230 utilizes a threshold controlled logic input to enable an external device or devices. If the comparator fails to receive an input from the power supply circuitry 240 indicating that the power supply circuitry 240 is operating at a voltage at or above (or, in some embodiments, at or below) the predetermined level, the fail sense circuitry 230 outputs a "fail" signal to the output circuitry 220. In this embodiment, the fail sense circuitry 230 provides the advantage of assurance to the pilot, operator or system that the power supply circuitry 240 is functional and/or operating at or within normal ranges, providing the additional advantage of immediately notifying the pilot, operator or system when the power supply circuitry 240 is not functional and/or not operating within normal ranges.

Preferably, the following events would cause the internal health monitor to provide a "fail" signal and cause pin K2 to go Open: a) failure of the ARINC decoder circuitry 210; b) loss of power to the annunciator 100; or c) loss of valid ARINC data input to the ARINC decoder circuitry 210. The health monitor watchdog timer requires a valid ARINC label to be received within a specified buffer time, which may be configured to be one of 0.5 second (s), 1.0 s. 1.75 s, 2.5 s, 5.0 s, 10.0 s, or 15.0 s. Either of the optional orthogonal external inputs can also provide a "fail" indication and cause pin K2 to go Open. Preferably, pin J1 (IN 1) is pre-defined as Normal=Power or Open, Fail=Ground, such that a ground on pin J1 (IN 1) would create an open on pin K2 (FAIL). Pin J1 can remain open if unused. Pin K3 (IN 2) is preferably pre-defined as Normal=Ground, Fail=Open or Power, such that an open or power signal on pin K3 (IN 2) would create an open on pin K2 (FAIL). Pin K3 may be required to be grounded if unused.

Although described herein as various embodiments, the fail sense circuitry 230 may, and preferably does, comprise both a health monitor and a settable voltage comparator. For example, if fail sense circuitry 230 outputs a ground signal, output circuitry 220 will output an "out" signal. In the alternative, if fail sense circuitry 230 receives an "open" input, fail sense circuitry 230 will output a "fail" signal to output circuitry 220. In this embodiment, output circuitry 220 will output a "fail" signal. This output is incorporated into the annunciator 100. In various embodiments, this combined FAIL output is uncommitted and may be used to drive a display legend, and/or changeover relay, and/or other fault reporting subsystems on the aircraft. Configurable options available for the fail sense feature may include: multiple timeout intervals for the watchdog timer; and a fail-on-high or fail-on-low option for one of the external fail inputs.

Although FIG. 2 illustrates an example bus converter circuit 200 forming part of the circuitry contained within the module housing 105 of the bus interface module 104, various changes could be made. For example, while shown as a series of signal processing steps, various signal processing steps could overlap, occur in parallel, occur simultaneously or concurrently, occur in a different order, or occur multiple times.

FIGS. 3A, 3B, 3C and 3D are exploded perspective views of an annunciator, or of components thereof, illustrated in FIG. 1. The annunciator 100 is further illustrated by these views. However, the description will be limited to a high level discussion in order to avoid obscuring the significance of the functionality introduced by the present disclosure. Those skilled in the art will recognize that the complete structure and operation of a typical annunciator 100 as normally used in avionics or military control systems is not depicted or described herein, since the missing details regarding numerous feature are already described in the existing patents identified above and incorporated herein by reference.

As described above, the annunciator 100 includes the housing 101 that receives a switch cap 107 at the front end, with the legend plate portion of the lens cap omitted to reveal the interior of the switch cap 107. A mounting sleeve 301 around a portion of the annunciator housing 101 is also shown in FIG. 3A, as well as a connector plug 302 inserted into the open rear end 103 of annunciator housing 101, receiving the irregular array 106 of pins (not visible in FIG. 3A). In general, the switch cap 107, as depicted in FIG. 3B with the legend plate of the lens cap included, includes a switch cap housing 303 receiving an array 304 of SMD LEDs that are mounted over a switch cap back plate 305 and connected to an electrical driving circuit (not visible in FIG. 3B). A member 306 for mechanical latching and release of the annunciator 100 (when implemented as a pushbutton switch) protrudes from the rear of switch cap back plate 305 and engages or disengages with a latch point when the switch cap 107 is depressed within the annunciator housing 101. Electrical connections (not shown) to the driving circuit are also exposed on the rear surface of switch cap back plate 305.

Figure 3C:
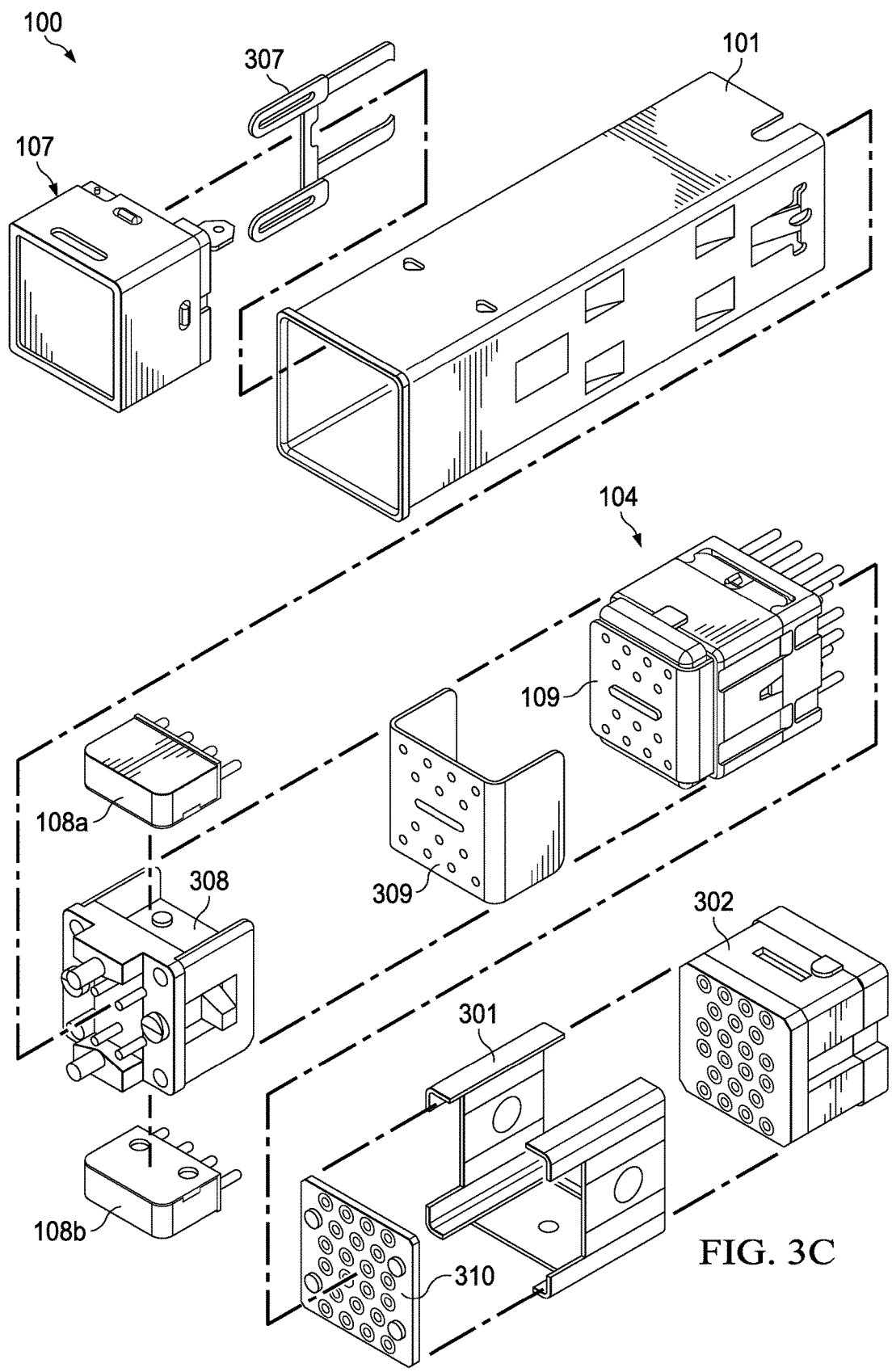
Figure 3D:
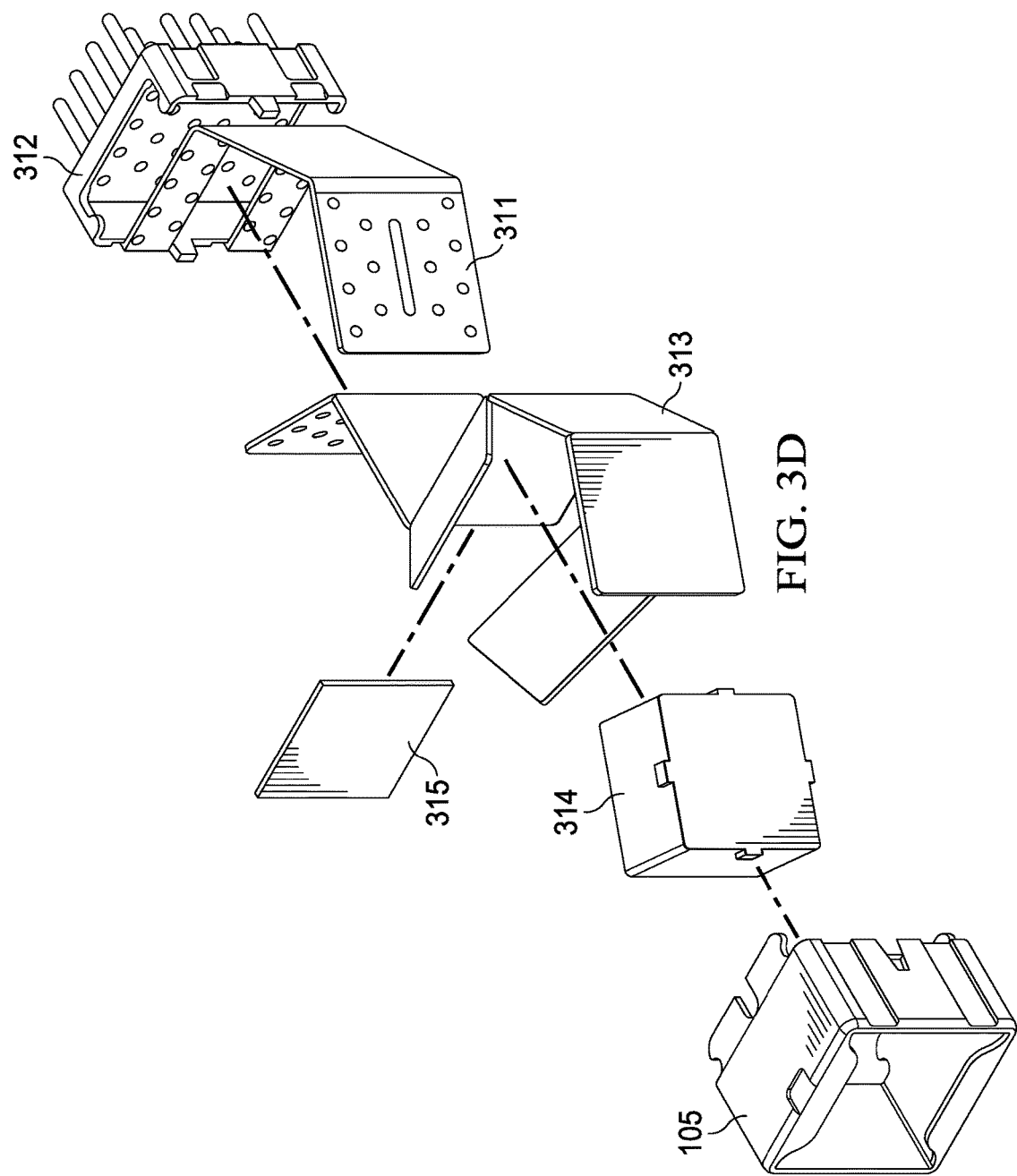

As illustrated in FIGS. 3C and 3D, the annunciator 100 includes the housing 101 receiving the switch cap 107 and a cap retainer 307 that selectively retains the switch cap 107 in the front of the annunciator housing 101, with portions extending around one side of a connector block assembly 308 also receive in annunciator housing 101 behind the switch cap 107. The connector block assembly 308 holds the snap-action micro-switches 108a-108b and/or other electronics (e.g., for logic functions such as a solid state relay). Behind the connector block assembly 308 within the annunciator housing 101 is the bus interface module 104, shown with a portion of the module housing 105 cut away. Pins for the micro-switches 108a-108b pass through aligned openings through a plastic insulator cover 309 (not shown in FIG. 1) that wraps around an end of the bus interface module 104 and aligned holes through the top spacer 109. Pins for the bus interface module 104 pass through aligned holes in a face seal 310 between the bus interface module 104 and the connector plug 302. In summary, the illuminated switch cap 107, the connector block assembly 308 (including two of each of the micro-switches 108-108b and/or other electrical devices such as logic components mounted within the connector block assembly 308), and the connector plug 302 are combined together with the bus interface module 104 within the annunciator housing 101, which may be installed with suitable mounting hardware (e.g., mounting sleeve 301) in an aircraft instrumentation panel.

As discussed above, the bus interface module 104 contains circuitry for the bus converter circuit 200, which is connected to eight of the pins for the bus interface module 104. Additional circuitry within the bus converter circuit 200 may provide electrical routing of electrical signals for the micro-switches 108a-108b and/or other electronics to external devices via other pins on the bus converter circuit 200 and the connector plug 302. As also discussed above, the bus converter circuit 200 within the bus interface module 104 preferably implements a transmitter, receiver, or both, together with associated circuits for interfacing to a multiplexed serial data bus and/or processing received signals (e.g., to detect labels). received of the type described above.

The complexity of the electronics required to interface an illuminated switch or indicator having the construction depicted in FIGS. 1 and 3A through 3D to a multiplexed serial data bus has heretofore prevented the transmitter/receiver and associated circuits from being included within the small, dedicated illuminated switch or indicator enclosure defined by annunciator housing 101. In one embodiment, the bus interface module 104 includes the circuitry required for implementation of control system in which an annunciator 100 extracts information directly from or exports information directly to a multiplexed serial data bus in order to interface directly with aircraft or military control systems or equipment and display information to a pilot, operator or system via illumination of the legend on the lens cap 107 in the annunciator 100.

In one embodiment, within the envelope of an illuminated pushbutton switch or indicator, additional electronics that can receive and/or transmit multiplexed serial data and indicate a message, and/or transmit switch status, and/or use the data to create some other discrete output. The indicator lamp electrical connections for the LEDs in array 304 and the 4-pin component electrical connections for the micro-switches 108a-108b and/or logic components are made via a folded lamp and logic control signal routing flex circuit 311 (shown partially unfolded in the exploded detail at the right of FIG. 3D). Signal routing flex circuit 311 routes electrical signals from the connector block assembly 308 around the bus converter circuit 200 within the bus interface module 104 down to a set of some of the pins within the irregular array 106 on a polymer pin holder assembly 312, to be received by the connector plug 302 with an interface configuration similar to that of a traditional avionics switch.

The bus converter circuit 200 within the bus interface module 104 is formed on an interface flex circuit 313. Interface flex circuit 313 contains electronics that can receive and/or transmit digital data directly from 2 or more of the pins of irregular array 106 that are mounted on the pin holder assembly 312, and which are connected via the connector plug 302 to the multiplexed serial data bus. As described above in connection with FIG. 2, eight of the pins within the irregular array 106 mounted on the pin holder assembly 312 within the arrangement shown in FIG. 1A are used by the bus converter circuit 200 within the bus interface module 104. Data processing by the bus converter circuit 200 and/or other data processing circuits on the interface flex circuit 313 convert specified information received or transmitted on those 2 or more pins into discrete signals for controlling one or more of the LEDs 304. In one exemplary embodiment, the received signals from the multiplexed serial data bus are data words containing labels used to reset the watchdog timer and prevent a FAIL output as described above. In other embodiments, however, different bits within data words received in the multiplexed serial data bus may be used for different purposed by the data processing within the bus converter circuit 200. For example, quantity comparisons of numerical data received from the bus connected to the 2 or more pins may be performed to determine whether the aircraft is above a certain altitude or traveling at less than certain airspeed. The multiplexed serial data is thus processed in the bus converter circuit 200 within the bus interface module 104 that is housed between the connector block assembly 308 and the connector plug 302. The bus converter circuit 200 within the bus interface module 104 is retained as an integral part of the annunciator 100 assembly with locking features in or on the annunciator housing 101.

The interface flex circuit 313 is a flexible plastic set of seven panels in the example shown, with five in a row and two projecting off the row in opposite directions at the second and third panels within the row. An end panel furthest from the two projecting panels has aligned holes allowing pins from the micro-switches 108a-108b and/or logic components to pass through. The panels have hinged connections allowing easier folding at predetermined locations, configured to allow the panels to be folded into a cube or three-dimensional rectangular box. Electrical connection points for the bus converter circuit 200 and/or other data processing circuits on the interface flex circuit 313 are soldered to a set of pins that are retained within the polymer pin holder assembly 312. The interface flex circuit 313 is then folded around an elastomeric cube 314 and one or more insulator sheets 315. Optionally, flexible adhesive may retain the interface flex circuit 313 in position folded around the elastomeric cube 314 and the insulator sheets 315. The signal routing flex circuit 311 is then wrapped around the interface flex circuit 313, the elastomeric cube 314, and the insulator sheets 315 so that the electrical connections for the connector block assembly 308 are routed to the opposite side from the side adjacent to the polymer pin holder assembly 312. The interface flex circuit 313, the elastomeric cube 314, the insulator sheets 315, and the signal routing flex circuit 311 are held in position by the plastic cover formed by module housing 105, which snaps to the polymer pin holder assembly 312. The stiff spacer 109 is placed over one end of module housing 105, and the plastic insulator cover 309 is placed on and around the stiff spacer 109.

Pins projecting from the connector block assembly 308 are soldered to an upper set of solder pads on the signal routing flex circuit 311. During assembly of the bus interface module 104, the signal routing flex circuit 311 is twice folded at 90° so that the bottom or rear surface of the connector block assembly 308 is resting on the upper or forward surface of the stiff spacer 109 (separated by the plastic insulator cover 309). After the connector block assembly 308 is soldered to the pads within the bus interface module 104, the assembled components are pressed into the annunciator housing 101.

Overall, the annunciator 100 (an illuminated pushbutton switch or indicator) formed as described above has advantages including: an illuminated display that can present predetermined status information to a pilot, operator or system, such as a backlit legend on the face plate of the switch cap 107 described above; a serial data communications device (e.g., within the interface flex circuit 313) that interfaces with an existing multiplexed serial data bus of the type described herein; circuits (e.g., within the interface flex circuit 313) that can extract formatted information received from and/or to format the information to be transmitted to the multiplexed serial data bus; optional internal switching mechanism(s) with the capability to provide a response from the pilot, operator or system back to the system; a suitable housing to protect the internal circuitry for required environmental and electromagnetic compatibility (EMC) performance; an integral mechanism that allows mounting of the illuminated switch or indicator to an existing control panel space; an integral connector to facilitate system wiring and ease of installation; and any additional electronic components, drivers and power supply needed or useful to perform the intended function.

Multiple difficult design and integration obstacles in avionics packaging and implementation, each imposing severe limitations on system functional implementation, are addressed and overcome in the design of an illuminated switch or indicator according to the present disclosure. The implementation described herein provides a unique new solution that minimizes both concerns by combining the required illuminated push button switch or indicator with a controlling electronic serial data bus interface. The implementation described is facilitated and made possible by an innovative combination of multiple technologies: microswitch technology and miniaturized electronics and flexible circuit assemblies that facilitate the inclusion of complex electronic functionality within the space of an illuminated push button switch or indicator housing. As a result, serial data bus interfacing may be accomplished within the compact volume of illuminated push button switch or indicator assembly. This miniaturized electronics, in combination with the advanced mechanical switch and indicator design described, establishes a new capability that is required to safely and robustly survive the harsh, stressful and dynamic electronic, electromagnetic and environmental parameters of modern aircraft system requirements. The details of both the mechanical and electrical design have been carefully combined in a unique and novel form. For example, the folded flexible circuit provides maximum circuit space in which to implement the complex data bus interface, while the internal elastomeric component with a flexible adhesive provides support to minimize mechanical stress, shock and vibration. The shape of the flex circuit allows electrical contact to the external pins to be both reliable and producible in high volume production. The stacked, double-flex design provides the ability to add additional capability within the assembly without sacrificing circuit space or compromising the reliability of the larger primary circuit assembly. The micro-switches provide safe robust reliable high life electronic capable switching within a minimal package envelope. The defined envelope of the micro-switches provides a predefined volume to incorporate form fit mix and match additional functional components instead of switches to provide additional enhanced functional capability.

Figure 4:
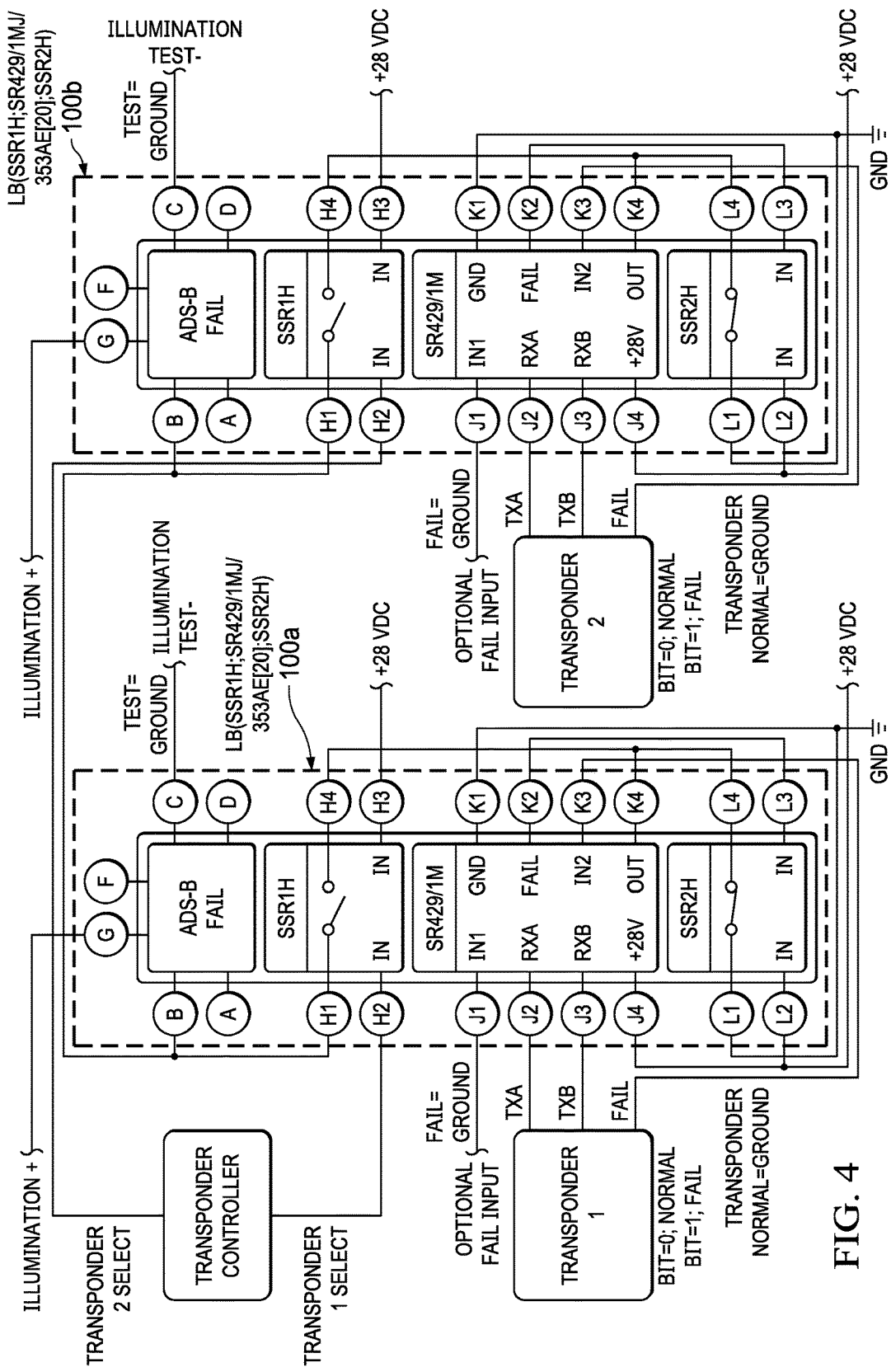
FIGS. 4 and 5 are each a block diagram, according to one of the various embodiments of the present disclosure, of an application for the aircraft annunciator that is configured to be coupled to a multiplexed serial data bus.
Figure 5:
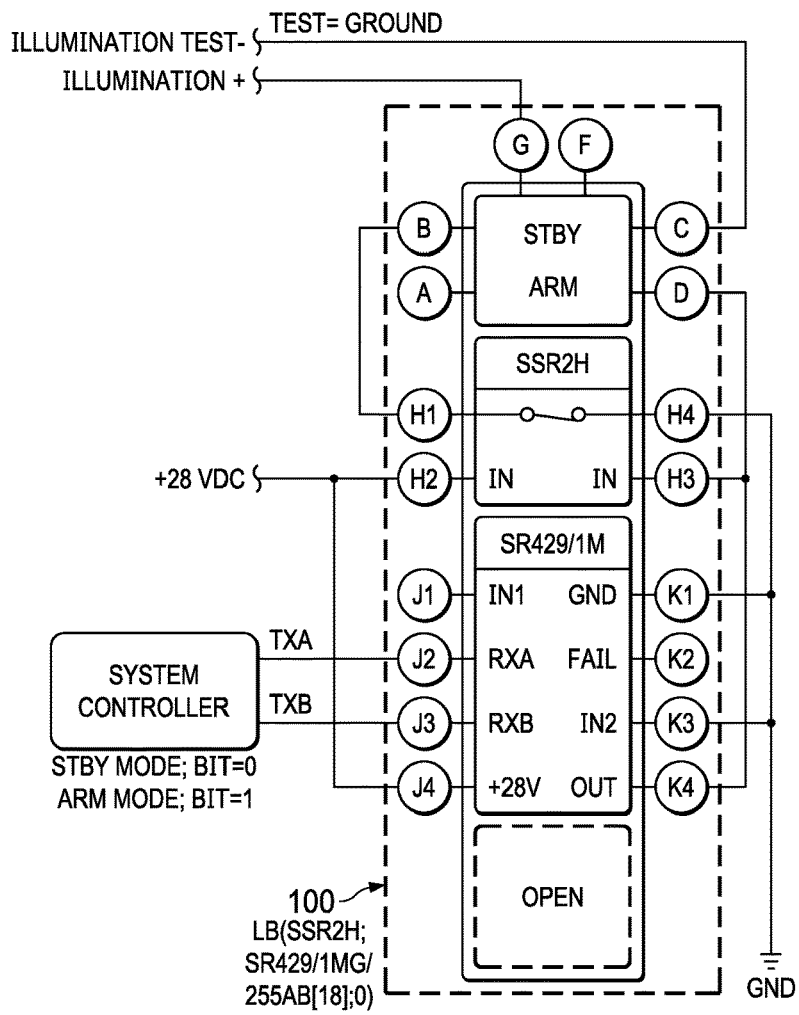

FIGS. 4 and 5 are each a block diagram, according to one of the various embodiments of the present disclosure, of an application for the aircraft annunciator that is configured to be coupled to a multiplexed serial data bus. FIG. 4 illustrates the typical application for the annunciator 100, which is for failure indications, although the device can be used for a wide range of ARINC data to analog conversion situations. What makes the annunciator 100 unique is the ability to include, inside of the annunciator housing 101, switches or logic modules. In the application of FIG. 4, the annunciator 100 is performing ADS-B Out failure indication. Integrated solid state relays (SSRs) are utilized to gate the signal between the two transponders (Transponder 1 and Transponder 2), and the two annunciators 100a, 100b with LED displays. In this situation, a discrete analog input (i.e. transponder health) is being monitored, as well as the ARINC 429 data information. This affords dual redundancies by monitoring each of the transponders, with the "transponder select" switch determining which transponder status is being shown on the annunciators 100a, 100b. The watchdog timer is being employed to monitor the validity of the ARINC data. This application takes advantage of a second (e.g., co-pilot) annunciator. In this application, two identically configured annunciators 100a, 100b each contain an ARINC bus converter (active Low Configuration), a normally open SSR and a normally closed SSR. Each transponder is being monitored independently by sending ARINC 429 data stream (Bit=0; Normal, Bit=1; Fail) and a discrete analog output for "transponder failure" (Normal=Ground, Fail=Open) to its respective ARINC bus converter.

The Transponder Controller determines which transponder is "active" by grounding Pin H2 of the top SSR to make Transponder 1 active or by grounding Pin H2 of the bottom SSR to make Transponder 2 active. If a failure exists on the "active" transponder, the status is displayed on both annunciators 100a, 100b. The status of the "inactive" transponder is not reported on the annunciator legends. Ground can be applied to Pin H4 of the "active" transponder, illuminating both legends, in three different ways: 1. GPS failure is transmitted to ARINC bus converter as Bit=1, creating a Ground output on OUT (Pin K4) due to this ARINC bus converter being configured as Active Low (Ground), while Ground on Pin K4 is tied directly to Pin H4; 2. If transponder fails, IN 2 (Pin K3) is Open, creating an Open on output FAIL (Pin K2), and the SSR acts as a drop out relay and will close, passing a ground signal to Pin H4, but if the transponder is good, IN 2 (Pin K3) is Ground (normal), therefore K2 is ground (normal) and the normally closed SSR is held open and no signal is passed on; and 3. If a valid ARINC message is not received by the ARINC bus converter/1M within the specified buffer timing, or the ARINC bus converter unit loses power, FAIL (Pin K2) will become Open, the SSR2H acts as a drop out relay and will close, passing the ground signal to Pin H4.

Application 2 is a simpler demonstration of the SR429/1M where the unit is used to provide a discrete annunciation of two states provided by the system controller. The internal watchdog timer is used to ensure proper performance of the ARINC bus converter and the validity of the data being received. Neither of the other optional inputs are being utilized in this example. In this application, the ARINC data bit from the system controller equals 0 in the STBY mode and the data bit equals 1 in the ARM mode. The ARINC bus converter specified in this application is an "Active Low" configuration where the output on PIN K4 (OUT) is Open when the data bit equals (equivalent to the STBY mode) and is Ground when the data bit equals 1 (equivalent to the ARM mode). When system controller is in the STBY mode (ARINC bit=0) the output of PIN K4 (OUT) of the specified ARINC bus converter (specified as Active Low Configuration) is open, which illuminates the upper "STBY" legend through the normally closed SSR relay contacts. When system controller is in the ARM mode (ARINC bit=1) the output of PIN K4 (OUT) becomes Ground, which will illuminate the "ARM" legend from PIN K4 (OUT) and extinguish the "STBY" legend by opening the normally closed SSR relay. Opposite polarity options may be employed.

Figure 6:
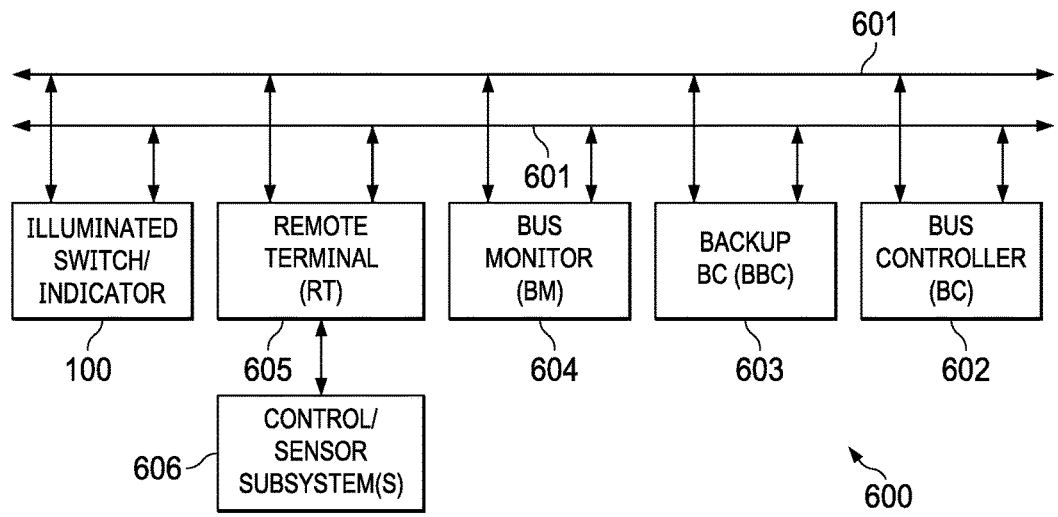
FIG. 6 is a block diagram of a generalized control system including an illuminated switch or indicator coupled to a serial data bus according to another embodiment of the present disclosure.

FIG. 6 is a block diagram of a generalized control system including an illuminated switch or indicator coupled to a serial data bus according to another embodiment of the present disclosure. The control system 600 of FIG. 6 is representative of MIL-STD-1553 systems. Control system 600 includes an illuminated switch or indicator 100, described above. The illuminated switch or indicator 100 is coupled or directly connected to a serial data bus 601, which may comprise redundant bus connectors (typically 2 to 4, e.g., bus A and bus B).

Also coupled to serial data bus 601 is a bus controller (BC) 602 and a backup bus controller (BBC) 603. Only one of BC 602 and BBC 603 operates to control the serial data bus 601 at any given moment; the other is redundant and operates, if at all, as a remote terminal. A bus monitor 604 is connected to serial data bus 601 that listens to all messages on and collects data from the serial data bus 601, for on-board bulk storage and/or remote telemetry, or used to observe the state and operational mode of the control system 600 for purposes of determining when to switch between the "hot" BC 602 and off-line BBC 603. A remote terminal (RT) 605 is connected to and receives information from or transmits information on the serial data bus 601. The RT 605 is coupled to a control or sensor subsystem 606 that is controlled by the RT 605 based on information received on the serial data bus 601 or that provides measurements communicated in information transmitted by RT 605 on the serial data bus 601. While depicted as separate devices in FIG. 6, RT 605 and control/sensor subsystem 606 may be integrated into a single device. In the illuminated switch or indicator 100, for instance, a remote terminal and control/sensor subsystem are contained in a single device.

The illuminated switch or indicator 100 contains a remote terminal for the serial data bus 601 within electrical circuitry on a flex circuit as described in further detail above. The illuminated switch or indicator 100 at least receives data from the serial data bus 601, and optionally also transmits data on the serial data bus 601. The received data may comprise status information regarding a remote equipment (e.g., an indication of equipment failure), a measurement from a sensor (e.g., a temperature or pressure sensor, either external to the aircraft, internal to the aircraft cabin, or associated with a specific piece of aircraft equipment such as an engine or a hydraulic pump), or the like. In response to the received data, the electrical circuitry within the illuminated switch or indicator 100 may cause illumination of a portion of the faceplate (e.g., bearing a legend "FAIL") as described in further detail above. Alternatively, in response to the received data, the electrical circuitry within the illuminated switch or indicator 100 may connect or disconnect selected pins on snap-action switches therein to connectors for the illuminated switch or indicator 100, enabling actuation of the illuminated pushbutton switch 100 to cause remote equipment to be connected to or disconnected from power, or to initiate an operation within the remote equipment. Signals for controlling remote equipment using the illuminated switch or indicator 100 may be, but are not necessarily, transmitted on the serial data bus.

Figure 7B:
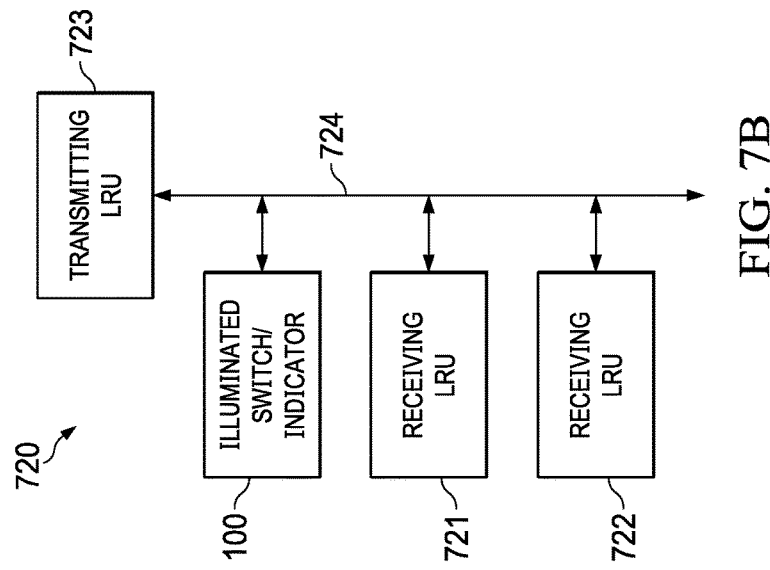
FIGS. 7A, 7B and 7C are block diagrams of a control system including an illuminated switch or indicator coupled to a serial data bus according to various embodiments of the present disclosure.
Figure 7A:
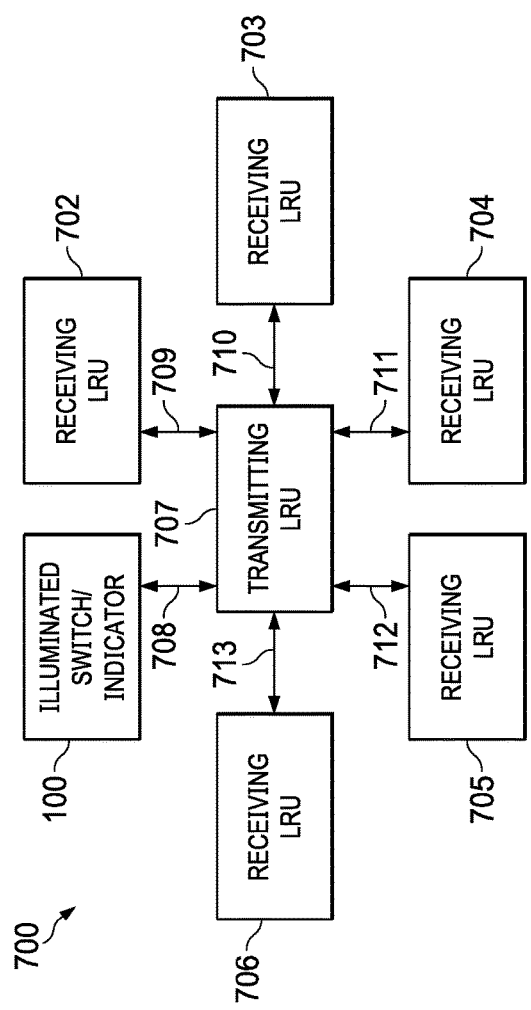
Figure 7C:
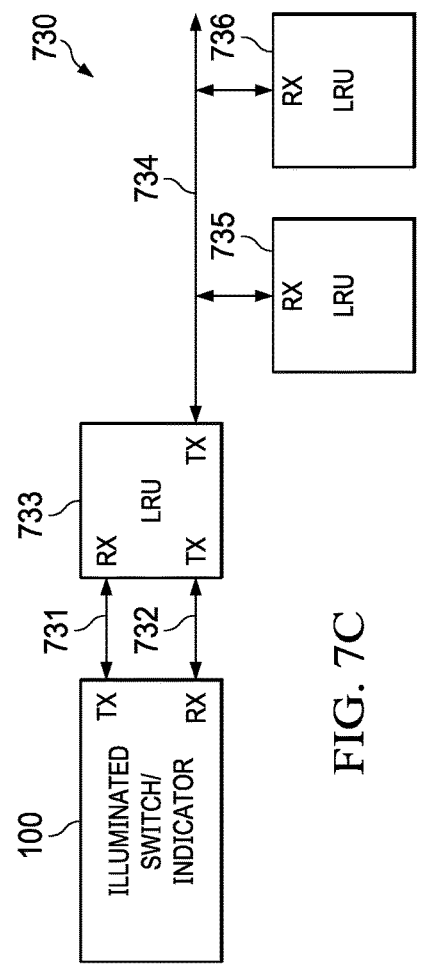

FIGS. 7A, 7B and 7C are block diagrams of a control system including an illuminated switch or indicator coupled to a serial data bus according to various embodiments of the present disclosure. The control systems 700, 720 and 730 of FIGS. 7A, 7B and 7C, respectively, are representative of ARINC-429 systems, as well as systems conforming to many other ARINC specifications. The control system 700 of FIG. 7A is a star topology in which an annunciator 100, described in further detail above, is one of a group of line replaceable units (LRUs) (or "sinks") 702, 703, 704, 705, and 706 all directly connected to a transmitting LRU (or "source") 707, each by a separate, respective serial data bus 708, 709, 710, 711, 712 and 713 as shown.

The control system 720 of FIG. 7B is a bus drop topology in which the annunciator 100 is one of a number group of addressable LRUs 721, 722 all connected to a transmitting LRU 723 by a common serial data bus 724. In this implementation, the single transmitting LRU 723 transmits concurrently to the group of addressable LRUs formed by the annunciator 100 and the other receiving LRUs 721, 722. The annunciator 100 in these types of implementations performs as an indicator of serial bus information, with any switch action for acknowledgement, action, etc., handled by separate wiring.

Each of the control systems 700, 720 may have multiple (e.g., up to 20 or more in some implementations) receiving LRUs per transmitting LRU, connected by two-wire connections. For bi-directional communication, two two-wire connections between the transmitter and receiver must be provided. Accordingly, either of the control systems 700, 720 in FIGS. 7A and 7B may be modified for bi-directional communication simply by having each LRU 701-707 and 721-723 include both a transmitter and receiver, with a separate two-wire serial data bus between the transmitter in one LRU and a receiver in the other LRU.

By way of explicit illustration, the control system 730 of FIG. 7C is a multiple bus topology in which at least the annunciator 100 is equipped with both a transmitter and receiver, respectively connected by two separate two-wire serial data busses 731, 732 to the counterpart receiver and transmitter of an LRU 733. Any of the LRUs (including the annunciator 100) depicted in FIGS. 7A and 7B may include multiple transmitters, multiple receivers, or both. For instance, in the example of FIG. 7C, LRU 733 includes two transmitters and is connected by serial data bus 734 to LRUs 735, 736, as well as by serial data bus 732 to the annunciator 100.

Although the above description is made in connection with specific exemplary embodiments, various changes and modifications will be apparent to and/or suggested by the present disclosure to those skilled in the art. It is intended that the present disclosure encompass all such changes and modifications as fall within the scope of the appended claims.

What is claimed is:
1. An annunciator, comprising:
a housing having a cross-section sized to fit within a panel cutout accommodating a single pushbutton aviation switch and having a length sufficient to accommodate:
an illumination source positioned within the housing to illuminate a faceplate over a first end of the housing, at least two connector pins within the housing at a second end of the housing, the at least two connector pins configured to be selectively coupled to a multiplexed serial data bus, and a bus converter circuit within the housing coupled to process signals from one or more of the at least two connector pins and configured to activate the illumination source in response to a status of one or more data bits on the multiplexed serial data bus.

2. The annunciator of claim 1, wherein the bus converter circuit comprises:

a bus decoder coupled to the at least two connector pins and configured to receive messages from the multiplexed serial data bus and to output a first signal as long as at least one valid message is received from the remote equipment during a predetermined period and to output a second signal when no valid message is received from the remote equipment during the predetermined period.

3. The annunciator of claim 2, wherein the bus converter circuit is further configured to activate the illumination source in response to one of an absence of a power supply signal or receipt of a signal indicating an external analog condition.

4. The annunciator of claim 3, wherein the bus converter circuit comprises:

a power supply circuit configured to receive a power supply signal and to output a first signal when the power supply circuit signal is not received;

a fail sense circuit configured to receive outputs from the bus decoder and the power supply circuit and to cause a fail signal to be output based on a logical combination of the outputs from the bus decoder and the power supply circuit.

5. The annunciator of claim 1, wherein the bus converter circuit comprises:

a bus decoder coupled to the at least two connector pins and configured to receive messages from the multiplexed serial data bus, process the received data bits, and output a signal on one or more of the at least two connector pins based on the processing results.

6. The annunciator of claim 1, wherein the fail sense circuit is further configured to receive at least one external analog fault signal and to cause the fail signal to be output based on a logical combination of the output from the bus decoder, the output from the power supply circuit, and the at least one external analog fault signal.

7. The annunciator of claim 1, further comprising:

a plurality of switches within the housing, wherein the bus converter circuit is configured to transmit a signal on the multiplexed serial data bus in response to actuation of one of the switches.

8. The annunciator of claim 1, wherein the bus converter circuit is configured to transmit a signal on the multiplexed serial data bus in response to signals received on one or more of the at least two connector pins.

9. The annunciator of claim 1, wherein the bus converter circuit comprises:

a bus decoder coupled to the at least two connector pins and configured to process input signals from one or more of the at least two connector pins, and transmit messages on the multiplexed serial data bus containing the processed results.

10. The annunciator of claim 1, wherein the remote equipment comprises an automatic dependent surveillance broadcast (ADS-B) transponder and wherein the faceplate includes a lens cap legend "ADS-B FAIL".

11. The annunciator of claim 1, further comprising:

a first flex substrate on which the bus converter circuit is formed, the first flex substrate folded around an elastomeric, three-dimensional rectangle and positioned on a pin holder in which a plurality of pins are mounted, the plurality of pins including the at least two connector pins configured to be selectively coupled to the multiplexed serial data bus;

a second flex substrate on which pin connection conductors are formed for electrically coupling selected pins within the plurality of pins to an array of light emitting diodes (LEDs) forming the illumination source, the second flex substrate wrapped around the folded first flex substrate and the elastomeric, three-dimensional rectangle; and a plastic cover retaining the first and second flex substrates in position on the pin holder.

12. A method for forming an annunciator, comprising:

providing a housing having a cross-section sized to fit within a panel cutout accommodating a single push-button aviation switch and having a length sufficient to contain an illumination source, at least two connector pins, and a bus converter circuit;

positioning the illumination source within the housing to illuminate a faceplate over a first end of the housing;

providing the at least two connector pins within the housing at a second end of the housing, the at least two connector pins configured to be selectively coupled to a multiplexed serial data bus;

coupling the bus converter circuit within the housing to process signals from one or more of the at least two connector pins; and configuring the bus converter circuit to activate the illumination source in response to a status of one or more data bits on the multiplexed serial data bus.

13. The method of claim 12, wherein the bus converter circuit comprises:

a bus decoder coupled to the at least two connector pins and configured to receive messages from the multiplexed serial data bus and to output a first signal as long as at least one valid message is received from the remote equipment during a predetermined period and to output a second signal when no valid message is received from the remote equipment during the predetermined period.

14. The method of claim 12, wherein the bus converter circuit is further configured to activate the illumination source in response to one of an absence of a power supply signal or receipt of a signal indicating an external analog condition.

15. The method of claim 14, wherein the bus converter circuit comprises:

a power supply circuit configure to receive a power supply signal and to output a first signal when the power supply circuit is not received;

a fail sense circuit configured to receive outputs from the bus decoder and the power supply circuit and to cause a fail signal to be output based a logical combination of the outputs from the bus decoder and the power supply circuit.

16. The method of claim 12, wherein the bus converter circuit comprises a bus decoder coupled to the at least two connector pins, wherein the method further comprises:

receiving messages from the multiplexed serial data bus; processing the received data bits; and outputting a signal on one or more of the at least two connector pins based on the processing results.

17. The method of claim 12, wherein the fail sense circuit is further configured to receive at least one external analog fault signal and to cause the fail signal to be output based on a logical combination of the output from the bus decoder, the output from the power supply circuit, and the at least one external analog fault signal.

18. The method of claim 12, further comprising:
providing a plurality of switches within the housing, wherein the bus converter circuit is configured to transmit a signal on the multiplexed serial data bus in response to actuation of one of the switches.

19. The method of claim 12, wherein the bus converter circuit is configured to transmit a signal on the multiplexed serial data bus in response to signals received on one or more of the at least two connector pins.

20. The method of claim 12, wherein the bus converter circuit comprises a bus decoder coupled to the at least two connector pins, the method further comprising:
processing input signals from one or more of the at least two connector pins; and
transmitting messages on the multiplexed serial data bus containing the processed results.

21. The method of claim 12, wherein the remote equipment comprises an automatic dependent surveillance—broadcast (ADS-B) transponder and wherein the faceplate includes a lens cap legend "ADS-B FAIL".

22. The method of claim 12, further comprising:
providing a first flex substrate on which the bus converter circuit is formed, the first flex substrate folded around an elastomeric, three-dimensional rectangle and positioned on a pin holder in which a plurality of pins are mounted, the plurality of pins including the at least two connectors;
providing a second flex substrate on which pin connection conductors are formed for electrically coupling selected pins within the plurality of pins to an array of light emitting diodes (LEDs) forming the illumination source, the second flex substrate wrapped around the folded first flex substrate and the elastomeric, three-dimensional rectangle; and
positioning a plastic cover to retain the first and second flex substrates in position on the pin holder.

23. An annunciator, comprising:
a housing;
an illumination source positioned within the housing to illuminate a faceplate over a first end of the housing;
at least two connector pins within the housing at a second end of the housing, the at least two connector pins configured to be selectively coupled to a multiplexed serial data bus; and
a bus interface module within the housing between the illumination source and the at least two connector pins, the bus interface module including:
a bus converter circuit coupled to receive signals from the at least two connector pins and configured to activate the illumination source in response to a status of one or more data bits on the multiplexed serial data bus,
a first flex substrate on which the bus converter circuit is formed, the first flex substrate folded around an elastomeric, three-dimensional rectangle and positioned on a pin holder in which a plurality of pins are mounted, the plurality of pins including the at least two connector pins,
a second flex substrate on which pin connection conductors are formed for electrically coupling selected pins within the plurality of pins to an array of light emitting diodes (LEDs) forming the illumination source, the second flex substrate wrapped around the folded first flex substrate and the elastomeric, three-dimensional rectangle, and a plastic cover retaining the first and second flex substrates in position on the pin holder.

24. The annunciator of claim 23, wherein the bus converter circuit comprises:
a bus decoder coupled to the at least two connector pins and configured to receive messages from the multiplexed serial data bus and to output a first signal as long as at least one valid message is received from the remote equipment during a predetermined period and to output a second signal when no valid message is received from the remote equipment during the predetermined period.

25. The annunciator of claim 23, wherein the bus converter circuit is further configured to activate the illumination source in response to one of an absence of a power supply signal or receipt of a signal indicating an external analog fault condition, wherein the bus converter circuit comprises:
a power supply circuit configured to receive a power supply signal and to output a first signal when the power supply circuit signal is not received;
a fail sense circuit configured to receive the output from the bus decoder, the output from the power supply circuit, and at least one external analog fault signal, and wherein the fail sense circuit further configured to cause a fail signal to be output based a logical combination of the output from the bus decoder, the output from the power supply circuit, and the at least one external analog fault signal.

26. The annunciator of claim 23, wherein the remote equipment comprises an automatic dependent surveillance broadcast (ADS-B) transponder and wherein the faceplate includes a lens cap legend "ADS-B FAIL".

* * * * *